United States Patent [19]

Tanaka et al.

[11] Patent Number: 4,767,108
[45] Date of Patent: Aug. 30, 1988

[54] ELASTIC BUSHING ASSEMBLY

[75] Inventors: Toru Tanaka, Nagoya; Koji Sawada, Toyota; Koji Shinohara, Kasugai, all of Japan

[73] Assignees: Toyota Jidosha Kabushiki Kaisha; Tokai Rubber Industries, Ltd., both of Aichi, Japan

[21] Appl. No.: 886,366

[22] Filed: Jul. 17, 1986

[30] Foreign Application Priority Data

Jul. 18, 1985 [JP] Japan ............................ 60-110205[U]

[51] Int. Cl.⁴ ...................... F16F 15/10; F16C 33/74
[52] U.S. Cl. ............................. 267/140.1; 267/141.2; 267/153; 267/293; 277/212 R; 384/147; 384/153
[58] Field of Search ............... 384/153, 152, 151, 147; 277/312 F, 212 R, 212 C, 207 R; 267/63 R, 63 A, 153, 140.1, 292, 293, 141.1, 141.2, 141.3, 141.4, 141.5, 141.6, 141.7; 180/75.2

[56] References Cited

U.S. PATENT DOCUMENTS

| 2,659,619 | 11/1953 | Kishline et al. | 267/63 |
| 3,331,642 | 7/1967 | Krauss | 384/153 |
| 3,858,950 | 1/1975 | Otto | 384/153 |
| 4,428,629 | 1/1984 | Colanzi et al. | 384/147 |

FOREIGN PATENT DOCUMENTS

| 1244095 | 7/1967 | Fed. Rep. of Germany | 384/153 |
| 2930462 | 1/1981 | Fed. Rep. of Germany | 384/147 |
| 153736 | 10/1984 | Japan | |

*Primary Examiner*—George E. A. Halvosa
*Assistant Examiner*—Matthew C. Graham
*Attorney, Agent, or Firm*—Parkhurst & Oliff

[57] ABSTRACT

An elastic bushing assembly including a rigid sleeve member disposed radially inwardly of an outer sleeve, the sleeve member having a radial flange extending radially outwardly from one axial end thereof, an elastic member interposed between the outer sleeve and the sleeve member, an inner sleeve disposed radially inwardly of the sleeve member, a sliding member interposed between the inner sleeve and the sleeve member and slidable relative to one of the inner sleeve and the sleeve member. A retainer member is located at one axial end of the inner sleeve corresponding to the radial flange of the sleeve member, and a sealing rubber member is in pressed abutting contact with the radial flange of the sleeve member and the retainer member, so as to provide sealing therebetween. The rubber member includes two radially spaced-apart annular sealing lips whose diameters increase in an axially outward direction of the sleeve member away from the radial flange. The outer sealing lip has a tapered distal end face whose diameter decreases in the axially outward direction.

10 Claims, 3 Drawing Sheets

ELASTIC BUSHING ASSEMBLY

BACKGROUND OF THE INVENTION

1. Field of Art

The present invention relates generally to an elastic bushing assembly, and more particularly to improvements in a sealing structure of an elastic bushing assembly suitable as an elastic damper at a pivotal connection in a vehicle suspension system.

2. Discussion of Related Art

An elastic bushing assembly used at a pivotal connection in a suspension system of an automotive vehicle, for example, a control arm bushing used for pivotally connecting a control arm to a member of a vehicle body or chassis, generllly employs a cylindrical elastic or resilient member made of a rubber material, which is interposed between an inner sleeve and an outer sleeve that are disposed in co-axial relation with each other. The elastic member has spring characteristics suitable for mainly absorbing or damping vibrational loads applied thereto in its radial direction, i.e., in the direction perpendicular to the axis of the bushing assembly. However, the use of a relatively hard or stiff rubber material for the elastic member inherently causes the bushing assembly to exhibit relatively stiff circumferential spring characteristic, i.e., hard spring characteristics in the direction of twisting or rotation about the axis of the bushing assembly.

In the light of the above, the use of a sliding member made of a self-lubricating frictionless material between the inner sleeve and the elastic member is proposed to reduce an effect of relatively stiff circumferential spring characteristics of the elastic member. For example, such sliding member is disclosed in U.S. Pat. No. 3,331,642, and Japanese Utility Model Application laid open in 1984 under Laid-Open Publication No. 59-153736. In such proposed bushing assembly, the frictional resistance between the inner sleeve and the elastic member is reduced due to the existence of the self-lubricating frictionless sliding member therebetween, whereby the inner sleeve and the elastic member are comparatively easily rotatable relative to each other. Thus, the sliding member permits the bushing assembly to demonstrate relatively soft circumferential spring characteristics or relatively reduced circumferential rigidity, while at the same time maintaining relatively stiff or rigid radial spring characteristics.

However, a known bushing assembly incorporating such a sliding member suffers from entry of dirts, grits or sludges in between the sliding surfaces of the sliding member and the inner sleeve, and consequent scoring or other damage of the sliding surfaces, or rusting of the inner sleeve which is usually made of a metallic material. Thus, the known bushing assembly indicated above has a drawback that the intended sliding function of the sliding member relative to the inner sleeve is easily deteriorated.

For solving the above drawback, the assignee of the present application developed an elastic bushing assembly as disclosed in U.S. Patent Application Ser. No. 802,051 feld Nov. 25, 1985. This elastic bushing assembly includes (a) an outer sleeve, (b) a rigid sleeve member disposed radially inwardly of the outer sleeve in co-axial relation with the same, the rigid sleeve member having a radial flange which extends radially outwardly from at least one of opposite axial ends of the rigid sleeve member, (c) an elastic or resilient member interposed between the outer sleeve and the rigid sleeve member in integrally fixed relation with the outer sleeve and the rigid sleeve member, (d) an inner sleeve disposed radially inwardly of the rigid sleeve member, (e) a sliding member interposed between the inner sleeve and the rigid sleeve member and slidable relative to one of the inner sleee and the rigid sleeve member, so as to reduce an effect of relatively stiff circumferential spring characterists of the elastic member, (f) a retainer member located at one of opposite axial ends of the inner sleeve corresponding to the radial flange of the rigid sleeve member, and (g) a sealing rubber member held in pressed abutting contact with an axially outer surface of the radial flange of the rigid sleeve member and a surface of the retainer member which faces the axially outer surface of the radial flange, so as to provide sealing between the retainer member and the rigid sleeve member. An example of a sealing rubber member disclosed in the above-identified Patent Application has two radially spaced-apart annular sealing lips whose diameters increase in the axially outward direction of the rigid sleeve member. These outer and inner annular sealing lips have distal end faces which are perpendicular to the axis of the bushing assembly.

In the elastic bushing assembly indicated just above, the sealing rubber member provides excellent sealing between the rigid sleeve member and the retainer member, effectively preventing entry of dirts, grits or sludges in between the sliding member and the inner sleeve and/or the rigid sleeve member, and maintaining the intended sliding function of the sliding member relative to the inner sleeve. Thus, the sliding member properly functions to reduce an effect of relatively stiff circumferential spring characteristics of the elastic member. Further, since the sliding member is interposed between the rigid sleeve member and the inner sleeve which are both comparatively rigid, the sliding member is well protected from deformation or cracking due to external vibrational stresses, and is therefore capable of serving for a longer period of time.

However, the sealing rubber member suffers an inconvenience that its sealing lips held in pressed abutting contact with the retainer member tend to be deflected or warped radially outwardly of the bushing assembly, allowing foreign matters such as dirts, grits or sludges to be accumulated between the retainer member and the warped end of the selaing lips. Consequently, the sealing lips are subject to wear due to abrasion by the foreign matters. Thus, the proposed bushing assembly is not completely satisfactory in terms of the service life of the sealing rubber member and consequently of the bushing assembly.

SUMMARY OF THE INVENTION

It is therefore an object of the present invention to provide an improved elastic bushing assembly wherein a sealing rubber member for sealing between a rigid sleeve member and a retainer member is suitably protected from undesirable deflection or warpage in the radially outward direction of the bushing assembly, and therefore protected from wear due to entry of foreign matters in between the rigid sleeve member and the retainer member.

According to the present invenion, there is provided an elastic bushing assembly comprising: an outer sleeve; a rigid sleeve member disposed radially inwardly of the outer sleeve in co-axial relation with the outer sleeve, the rigid sleeve member having a radialf lange which extends radially outwardly from at least one of opposite axial ends of the sleeve member, (c) an elastic member interposed between the outer sleeve and the rigid sleeve member in integrally fixed relation with the outer sleeve and the rigid sleeve member, (d) an inner sleeve disposed radially inwardly of the rigid sleeve member, (e) a sliding member interposed betwen the inner sleeve and the rigid sleeve member and slidable relative to one of the inner sleeve and the rigid sleeve member, so as to reduce an effect of relative stiff circumferential spring characteristics of the elastic member, (f) a retainer member located at one of opposite axial ends of the inner sleeve corresponding tot he at least one of opposite axial ends of the rigid sleeve member, and (g) a sealing rubber member held in pressed abutting contact with an axially outer surface of the radial flange of the rigid sleeve member and a surface of the retainer member which faces the axially outer surface of the radial flange, so as to provide sealing between the retainer member and the rigid sleeve member. The sealing rubber member comprises an outer annular sealing lip and an inner annular sealing lip which is spaced radially inwardly spaced from the outer sealing lip. The outer and inner sealing lips have diameters which increase in an axially outward direction of the rigid sleeve member away from the radial flange. The outer sealing lip has a distal end face which is tapered such that the distal end face has a diameter which decreases in the axially outward direction of the rigid sleeve member.

In the elastic bushing assembly of the present invention constructed as described above, at least the outer sealing lip whose tapered end face is in pressed abutting contact with the retainer member is effectively protected from undesirable deflection or warpage in the radially outward direction of the bushing assembly, and therefore suitably protected from wear due to entry of foreign matters such as dirts, grits or sludges in between the otherwise warped end of the outer sealing lip and the retainer member. Thus, the life expectancy of the sealing rubber member and therfore of the bushing assembly is prolonged.

According to one optional feature of the present invention, the inner annular sealing lip, as well as the outer annular sealing lip, has a distal end face which is tapered such that the distal end face of the outer sealing lip decreases in the axially outward direction.

According to another optional feature of the invention, the inner annular sealing lip has an annular groove formed in a radially inner proximal portion thereof.

According to a further optional feature of the invention, the inner annular sealing lip has an annular groove formed in a radially outer proximal portion thereof.

In accordance with yet another optional feature of the invention, the sealing rubber member further comprises a base portion which adheres to the axially outer surface of the radial flange of the rigid sleeve member, and from which the outer and inner annular sealing lips extend, the base portion having an annular groove formed in a radially innermost part thereof, the radially innermost part of the base portion being held spaced apart from the sliding member engaging the rigid sleeve member.

In accordance with a yet further optional feature of the invention, the outer and inner annular sealing lips have substantially the same length as measured in the axial direction of the rigid sleeve member.

According to another optional feature of the invention, the inner annular sealing lip has a length smaller than the outer annular sealing lip, as measured in the axial direction of the rigid sleeve member. In this case, the inner annular sealing lip has an annular groove formed in a radially outer portion thereof.

According to a further optional feature of the present invention, the inner annular sealing lip has a wall thickness which decreases in an axially inward direction of the rigid sleeve member.

BRIEF DESCRIPTION OF THE DRAWINGS

These and optional objects, features and advantages of the present invention will become more apparent by reading the following description of preferred embodiments of the invention, when considered in connection with the accompaying drawings, in which.

DETAILED DESCRIPTION OF THE PREFERRED EMBODIMENTS

To further clarify the principle of the present invention, the preferred embodiments of the invention will be described in detail by reference to the accompanying drawings.

Figure 1:
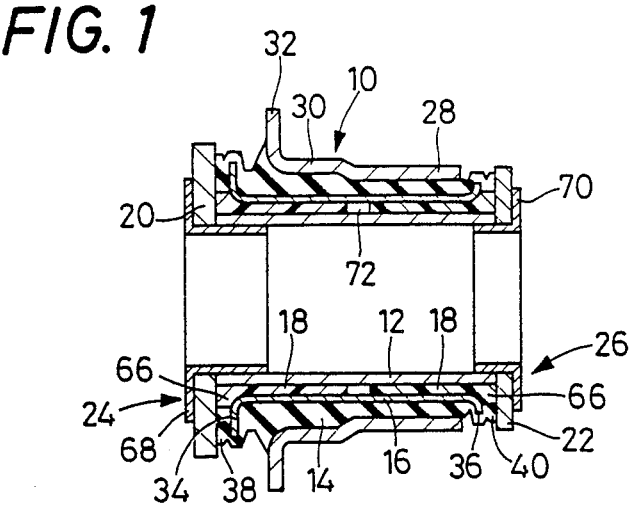
FIG. 1 is an elevational view in longitudinal cross section of one embodiment of an elastic bushing assembly of the present invention.

Referring first to FIG. 1, there is shown an elastic bushing assembly according to one embodiment of the invention. In the figure, reference numeral 10 generally designates a cylindrical outer metal sleeve. A cylindrical inner metal sleeve 12 is provided as a radailly innermost member of the bushing assembly, such that the inner metal sleeve 12 is coaxial with the outer metal sleeve 10 and radially inwardly spaced from the sleeve 10 by a suitable distance. Between these outer and inner sleeves 10, 12, there is disposed an elastic member in the form of a cylindrical rubber block 14. Between this rubber block 14 and the inner sleeve 12, there are interposed a rigid sleeve member in the form of a metallic sleeve 16 having comparatively high rigidity, and a cylindrical sliding member in the form of a pair of plastic bushings 18, 18 which are made of a suitable oil-containing plastic material (for example, polyacetal resin containing a suitable oil). The inner and outer sleeves 12, 10, rubber block 14, metallic sleeve 16 and plastic bushings 18, 18 are retained by two annular retainer members 20, 22 at opposite longitudinal ends of the bushing assembly, which retainer members 20, 22 are fitted on respective collars 24, 26 which engage the inner sleeve 12.

The outer sleeve 10 includes a stepped-diameter portion consisting of a small-diameter portion 28 and a larger-diameter portion 30. The outer sleeve 10 further includes a radial flange 32 which extends radially outwardly from one of opposite ends of the large-diameter portion 30 remote from the small-diameter portion. The elastic bushing assembly is press-fitted into a bearing eye in a control arm or other member sof a suspension system of a vehicle, such that the stepped-diameter portion 28, 30 of the outer sleeve 10 is inserted into the bearing eye with the small-diameter portion 28 leading the large-diameter portion 30.

The rigid sleve member or metallic sleeve 16 has a slightly larger overall length than the outer sleeve 10, and includes radial flanges 34, 36 which extend radially outwardly from opposite ends of a cylindrical portion of the sleeve 16. The rubber block 14 interposed between the metallic sleeve 16 and the outer sleeve 10 is secured by means of vulcanization to the outer surface of the cylindrical portion of the metallic sleeve 16, to the mutually facing axially inner surfaces of the radial flanges 34, 36 of the sleeve 16, and to the inner surface of the stepped-diameter portion 28, 30 of the outer sleeve 10. The rubber block 14 is radially pre-compressed by radial drawing of the outer sleeve 10. The radial flange 34 of the metallic sleeve 16 which corresponds to the large-diameter portion 30 of the outer sleeve 10 has a larger outside diameter than the radial flange 36 of the metallic sleeve 16 which corresponds to the small-diameter portion 28 of the outer sleeve 10.

Annular sealing rubber members 38, 40 are vulcanized together with the rubber block 14, such that the sealings are secured to the axially outer surfaces of the radial flanges 34, 36 of the metallic sleeve 16, respectively. As depicted in detail in FIG. 2, the annular sealing rubber member 38 includes a base portion 41 at which the sealing 38 is secured to the outer surface of the radial flange 34, and a pair of annular sealing lips 42, 44 which have the same length in the axial or longitudinal direction of the metallic sleeve 16. The annular sealing lips 42, 44 are spaced apart from each other in the radial direction of the radial flange 34, and extend substantially parallel to each other from the base portion 41 such that the diameters of the selaing lips 42, 44 increase as they extend away from the base portion 41 in the axial direction of the metallic sleeve 16. The radially inner sealing lip 42 has an annular groove 46 formed in its radially inner, proximal portion adjacent to the base portion 41. Another annular groove 48 is formed in the radially innermost part of the base portion 41. The distal ends of the inner and outer sealing lips 42, 44 are formed with respective tapered end faces 50, 52 of the same taper angle whose diameters decrease as the sealing lips 42, 44 extend away from the base portion 41. That is, the diameters of the tapered end faces 50, 52 decrease in the axially outward direction of the metallic sleeve 16.

Figure 3:
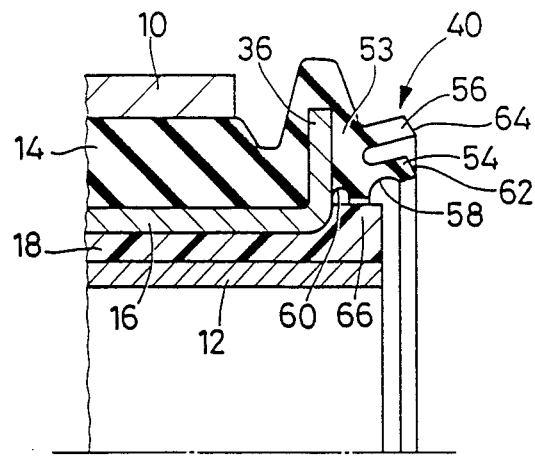

Like the annular sealing rubber member 38, the other annular sealing rubber member 40 includes a base portion 53, an inner and an outer annular sealing lip 54, 56, and two annular grooves 58, 60, as illustrated in FIG. 3. The distal ends of the sealing lips 54, 56 are formed with respective tapred end faces 62, 64 similar to the tapered end faces 50, 52 of the annular sealing rubber member 38.

Each of the plastic bushigns 18, 18 which serve as the cylindrical sliding member of the instant elastic bushign assembly has a length substantially equal to a half of the length of the metallic sleeve 16, and includes a radial flange 66 at its end corresponding to the radial flange 34, 36 of the metallic sleeve 16, as shown in FIG. 1. Each radial flange 66 extends a slight distance radially outwardly so that its outside diameter is slightly smaller than the inside diameter of the corresponding base portion 41, 53 of the annular sealing rubber member 38, 40. The plastic bushings 18, 18 are press-fitted in the metallic sleeve 16 such that the radial flanges 66, 66 are held in pressed contact with the radial flanges 34, 36 of the sleeve 16. In this condition, however, the radial flanges 66, 66 of the plastic bushings 18, 18 are spaced a small distance from the corresponding base portion 41, 53 of the annular sealing rubber members 38, 40. Each plastic bushing 18 has a plurality of radial grooves (not shown) formed in the end face of its radial flange 66 so as to extend from its inner edge to its outer edge, and a plurality of axial grooves (not shown) formed in its inner surface over its entire length. These axial grooves are connected at their one end with the respective radial grooves.

Figure 2:
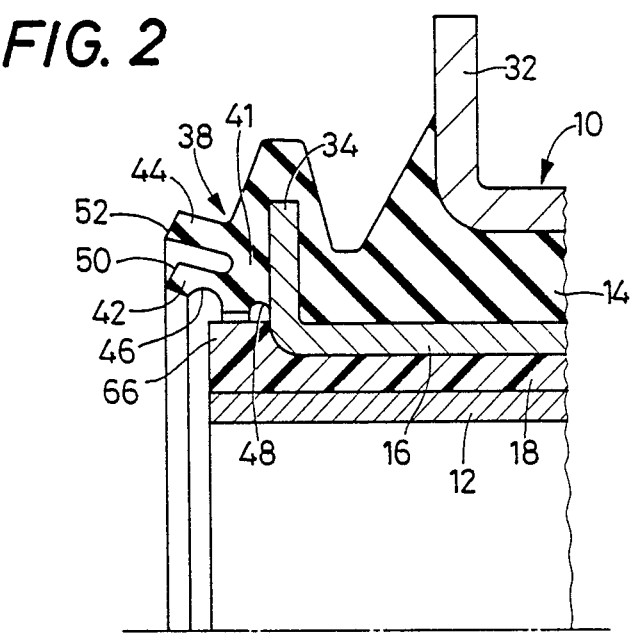
FIGS. 2 and 3 are fragmentary views in longitudinal cross section, showing opposite longitudinal end portions of the elastic bushing assembly of FIG. 1, respectively.

The length of the inner sleleve 12 is selected to be substantially equal to or slightly larger than a distance between the axially outer ends of the plastic bushings 18, 18, while the outside diameter of the same sleeve 12 is selected so that the sleeve 12 is rotatable relative to the plastic bushings 18, 18 after the bushings 18, 18 have been fitted on the inner sleeve 12. As is apparent from FIGS. 2 and 3, the length of the inner sleeve 12, or the distance between the outer ends of the plastic bushings 18, 18 is shorter than a distance between the extremities of the annular sealing rubber members 38, 40 in the axial direciton of the bushing assembly. Therefore, the two pairs of sealing lips 42, 44, 54, 56 project away from the corresponding ends of the plastic bushings 18, 18 and the inner sleeve 12, in the axial direction of the bushing assembly, when the retainer members 20, 22 are not mounted in place on the bushing assembly, as illustrated in FIGS. 2, 3.

The retainer member 20 located on the side of the radial flange 32 of the outer sleeve 10 has an outside diametr larger than that of the other retainer member 22, while the two retainer members 20, 22 have substantially the same inside diameter as the inside diameter of the inner sleeve 12, as indicated in FIG. 1. The retainer members 20, 22 are held in position while being held in abutting contact with radial flanges 68, 70 of the corresponding collars 24, 26, and the corresponding end faces of the inner sleeve 12. In this condition, the sealig lips 42, 44, and 54, 56 of the annular sealing rubber members 38, 30 are elastically compressed between the corresponding retainers 20, 22, and the corresponding radial flanges 34, 36 of the metallic sleeve 16. Thus, the annular sealing rubber members 38, 40 maintain fluid tightness between the radial flanges 34, 36, and the retainers 20, 22, thereby preventing entry of dirts, grits or sludges in between the plastic bushings 18, 18 and the inner sleeve 12.

Since the length of the inner sleeve 12 is substantially equal to or only slightly larger than the distance between the outer ends of the plastic bushings 18, 18 as previously mentioned, the retainer members 20, 22 are rotatable relative to the radial flanges 66, 66 of the plastic bushings 18, 18. This dimensional relation and the previosuly described outside diameter of the inner sleeve 12 relative to the inside diameter of the plastic bushings 18, 18, permit the inner sleeve 12 an the plastic bushings 18, 18 to be rotatabel relative to each other, thereby enablng the elastic bushing assembly to exhibit comparatively soft spring characteristics in the circumferential direction, when a torsional or twisting force or load is applied between the outer sleeve 10 fixed to a control arm or other members of a vehicle suspension, and the inner sleeve 12 secured to a pivot pin or shaft of the suspension. This relatively soft spring characteristics in the circumferential direction of the elastic bushing assembly is comparatible with relatively hard or stiff spring characteristics of the rubber block 14 in the radial direction.

The plastic bushings 18, 18, which are spaced apart from each other in the axial direction, cooperate with the inner sleeve 12 and the metallic sleeve 16 to define an annular lubricant reservoir 72 which is filled with a suitable lubricant such as rubber grease. The lubricant is delivered from the reservoir 72 through the previously indicated axial and radial grooves (formed in the inner surface of the bushings 18, 18 and in the end faces of the radial flanges 66), to lubricate the entire sliding surfaces of the plastic bushings 18, 18. This lubrication facilitates rotational movements of the plastic bushings 18, 18 and therefore of the rubber block 14 relative to the inner sleeve 12, and protects the plastic bushings 18, 18 against wear at their sliding surfaces.

In the present elastic bushing assembly, the sealing lips 42, 44, 54, 56 of the annular sealing rubber members 38, 40 elastically compressed between the radial flanges 34, 36 of the metallic sleeve 16 and the retainer members 20, 22, serve to provide fluid-tight sealings between the flanges 34, 36 and the retainer members 20, 22, thereby preventing dirts, grits or sludges from entering in between the plastic bushings 18, 18 and the inner sleeve 12, or in between the plastic busings 18, 18 and the retainer members 20, 22, as previously described. Hence, the effect of the plastic bushings 18, 18 to give the busing assembly relatively soft circumferential spring characteristics (to reduce an effect of relatively stiff circumferential spring characteristics of the rubber block 14) may be maintained for a prolonged period. In addition, the tapered end faces 50, 52, 62, 64 of the sealing lips 42, 44, 54, 56 of the annular sealing rubber members 38, 40 contribute to prolonged life expectancy of the sealing rubber members 38, 40, and consequently of the elastic bushing assembly. This is an important feature of the instant bushing assembly.

Described in greater detail, if the end faces of sealing lips 42, 44, 54, 56 of the sealing rubber members 38, 40 are perpendicular to the axis of the bushing assembly, the sealing lips inevitably tend to be deflected or warped radially outwardly of the bushing assembly, when the retainer members 20, 22 are brought into pressed abutting contact with the inner and outer sealing lips. In this condition, the end portions of the sealing lips, particularly the end portions of the radially outer sealing lips 44, 56 are not properly positioned with respect to the inner surface of the retainer members 20, 22, whereby dirts, grits or sludges may easily accumulate on the warped ends of the sealing lips 44, 56 and adhere to the inner surface of the retainer members 20, 22, causing the sealing lips 44, 56 to wear due to abrasion by such foreign matters on the retainer members 20, 22, since the sealing rubber members 38, 40 and the retainer members 20, 22 are rotated relative to each other during the service of the elastic bushing assembly. In the instant bushing assembly, however, the ends of all sealing lips 42, 44, 54, 56 are tapered, that is, formed with the tapered distal end faces 50, 52, 62, 64 as previously described. These tapered ends of the lips 42, 44, 54, 56 are effective to prevent the lips from being deflected or warped radially outwardly of the retainer members 20, 22, thereby avoiding otherwise possible entry of foreign matters in between the sealing lip and the retainer members, and consequent wear of the sealing lips due to abrasion by the entered foreign matters. Accordingly, the annular sealing rubber members 38, 40 with the thus constructed sealing lips 42, 44, 54, 56 are comparatively durable, contributing to an increase in the life expectancy of the elastic bushing assembly.

Similar results may be obtained even if only the radially outer sealing lips 44, 56 are formed with the tapered edges 52, 64.

Further, the annular grooves 46, 58 formed in the radially inner proximal portions of the radially inner sealnglips 42, 54 function to reduce surface pressures between the end faces of the selaing lips 42, 54 and the inner surfaces of the retainer members 20, 22, thus minimizing frictional wear of the radially inner sealing lips 42, 54 and accordingly increasing the service life of the annular sealing rubber members 38, 40 and the bushing assembly.

Furthermore, since the inside diameter of the base portions 41, 53 of the annular sealing rubber members 38, 40 is slightly larger than the inside diameter of the radial flange 66 of the plastic bushings 18, 18, and since the annular grooves 48, 60 are formed in the radially innermost parts of the base portions 41, 53, the radial flanges 66 of the plastic bushings 18, 18 are protected from being forced by the annular sealing rubber members 38, 40 when the plastic bushings 18, 18 are press-fitted in the metallic sleeve 16. This arrangement also contributes to increasing the life expectancy of the sealing rubber members 38, 40.

The radial flanges 66 inteprosed between the radial flanges 34, 36 of the metallic sleeve 16 and the retainer members 20, 22 serve to maintain a constant axial compressive force applied to the sealing rubber members 38, 40, thus preventing excessive elastic deformation, and consequent deterioration of the sealing rubber members 38, 40 upon application of an excessive axial load thereto. Thus, the sealing effect of the sealing rubber members 38, 40 may be maintained for a longer period of time.

Figure 4:
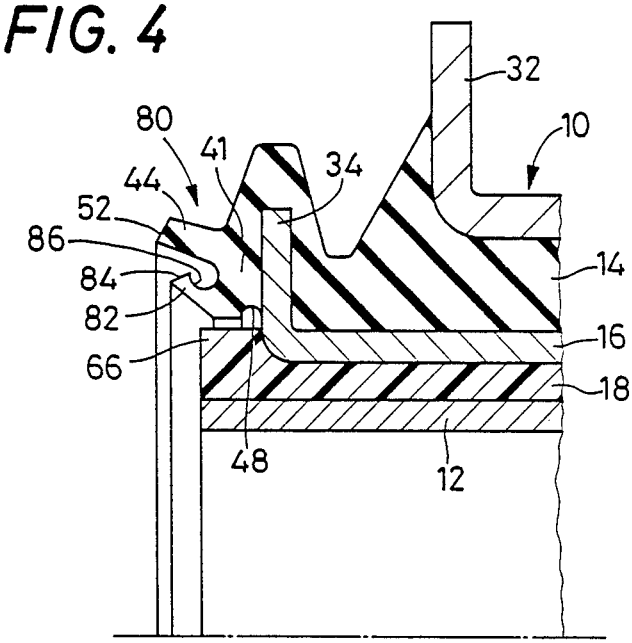
FIGS. 4 and 5 are fragmentary views corresponding to those of FIGS. 2 and 3, respectively, illustrating modified embodimens of the present invention.
Figure 5:
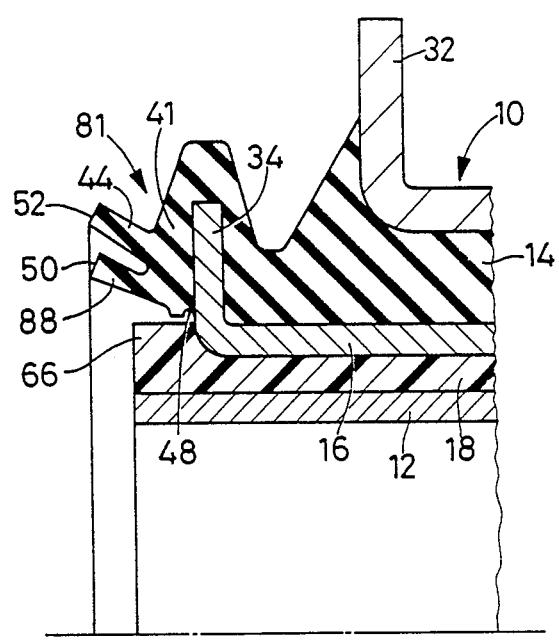

Referring next to FIGS. 4 and 5, modified embodiments of the present invention will be described. These embodiments are identical with the preceding embodiment, except for their annular sealing rubber members 80, 81 provided on the side of the radial flange 32 of the outer sleeve 10, which rubber members 80, 81 are different to some extent from the sealing rubber member 38 of the preceding embodiment. In FIGS. 4 and 5, the same reference numerals as used in FIGS. 1-3 are used to identify the corresponding elements. Repeated detailed description of these corresponding elements will not be provided.

In the modified embodiment of FIG. 4, the annular sealign rubber member 80 includes the radially outer sealing lip 44 of the same configuration as the lip 44 of the preceding embodiment, and a radially inner sealing lip 82 which has an axial length slightly smaller than that of the radially outer sealing lip 44. The angle of inclination of the radially inner sealing lip 82 with respect to the axis of the elastic bushing assembly is slightly larger than that of the radially outer sealign lip 44. The radally inner sealing lip 82 has a tapered end face 84 whose taper angle is smaller than that of the tapered end face 52. The annular sealing rubber member 80 has an annular groove 86 which is formed in a portion of the radially inner sealing lip 82 (in this example, between the tapered end face 84 and the base portion 41). The sealing rubber member 80 also has the annular groove 48 in the radially innermost portion of the base portion 41, as provided in the sealing rubber member 38 of the preceding embodiment.

In the thus constructed annular sealing rubber member 80, its radially outer saling lip 44 is protected against radially outward deflection or warpage relative to the retainer member 20, and therefore against wear due to abrasion by foreign matters entered between the warped sealing lip 44 and the inner surface of the retainer member 20. Thus, the life expectancy of the sealing rubber member 80 and the bushing assembly is prolonged. Further, the annular groove 48 serves to prevent the sealing rubber member 80 from forcing the radial flange 66 of the corresponding plastic bushing 18 press-fitted in the metallic sleeve 16.

In the present modified embodiment, the radially inner sealing lip 82 tends to be easily deflected radially outwardly upon pressed abutting contact with the retainer member 20, since the sealing lip 82 is inclined a greater angle than the radially outer sealing lip 44 with respect to the axis of the bushing assembly, and since the annular groove 86 is formed in the radially outer portion of the sealing lip 82. Hence, the radially inner sealing lip 82 is prevented from being deflected over the radial flange 66 of the corresponding plastic bushing 18. An annular space formed between the two sealing lips 44, 82 may be advantageously used as a reservoir for a lubricant.

In another modified embodiment of FIG. 5, the annular sealing rubber member 81 includes a radially inner sealinglip 88 which has substantially the same configuration as the radially inner sealing lip 42 of the sealing rubber member 38 of the previous embodiment of FIGS. 1-2. However, the radially inner sealing lip 88 does not have such an annular groove as indicated at 46 in FIG. 2. Instead, the sealing lip 88 is formed such that its thickness decreases in the direction from the tapered edge 50 toward the proximal portion. Like the sealing lip 42 of the previous embodiment, the thus constructed sealing lip 88 has a relatively reduced surface pressure exerted upon the inner surface of the retainer member 20, and is therefore protected against wear.

It is possible that the annular sealing rubber member 40 at the other axial end of the bushing assembly is replaced by the sealing rubber member 80 or 81 constructed as described above.

While a few embodiments of the present invention has been described for illustrative purpose only, it is to be understood that the invention is by no means confined to the details of disclosure of the illustrated preferred embodiments.

However, various changes and modifications may be made in the present invention, for example, in the angle of inclination or extension of the radially inner and outer sealing lips of the annular sealing rubber members with respect to the axis of the elastic busing assembly, in the length of the sealing lips in the axial direction of the bushing assembly, in the radial thickness of the sealing lips, and in the taper angle of the tapered edges of the sealing lips. These parameters may be suitably determined, depending upon the specific radial thickness of the annular sealing rubber members after the assembling of the bushing assembly, material of the sealing rubber members, and other conditions. Further, the sealing rubber members may be formed of a material which is different from the material of the rubber block 14.

Each of the sealing rubber member structures used in the illustrative embodiments may be employed for only one of the opposite axial ends of the elastic bushing assembly, depending upon the mounting location and other mounting condition of the bushing assembly.

While the sliding member in the form of the plastic busings 18, 18 is adapted to be slidable relative to the inner sleeve 12, the principle of the present invention is equally applicable to other types of elastic bushing assembly in which the sliding member is slidable relative to a rigid sleeve member, or to both of the rigid sleeve member and the inner sleeve, or in which the sliding member is a one-piece cylindrical member, or formed of a self-lubricitng bearing alloy or other metallic materials. The present invention may also be embodied as an elastic bushing assembly in which the retainer members 20, 22 are supported by suitable brackets, or brackets serve as retainer members.

In essence, the concept of the present invention is applicable to an elastic bushing assembly which includes: a rigid sleeve member disposed radially inwardly of an outer sleeve in co-axial relation with the same and having a flange which extends radially outwardly from at least one of opposite axial ends of the rigid sleeve member; a suitable cylindrical elastic member interposed between the outer sleeve and the rigid sleeve member in integrally fixed relation with these elastic and rigid members; a sliding member disposed between the rigid sleeve member and an inner sleeve disposed radilly inwardly of the rigid sleeve member, which sliding member being slidable relative to at least one of the rigid sleeve member and the inner sleeve so as to reduce an effect of relatively stiff circumferential spring characteristics of the elastic member; and a sealing rubber member which is held in abutting pressed contact with an outer surface of the flange of the ridig sleeve member and an opposite surface of a retainer member positioned at one axial end of the inner sleeve, in order to provide a sealing between the flange of the rigid sleeve member and the retainer member.

It will be obvious that the present invention may be embodied with various other changes, modifications and improvements which may occur without departing from the spirit and scope of the invention defined in the appended claims.

What is claimed is:

1. An elastic bushing assembly comprising:
   an outer sleeve;
   a rigid sleeve member disposed radially inwardly of said outer sleeve in co-axial relation with said outer sleeve, said rigid sleeve member having a radialy flange which extends radially outwardly from at least one of opposite axial ends of the sleeve member;
   an elasic member interposed between said outer sleeve and said rigid sleve member in integrally fixed relation with said outer sleeve and said rigid sleeve member;
   an inner sleeve diposed radially inwardly of said rigid sleeve member;
   a sliding member interposed between said inner sleeve and said rigid sleeve member and slidable relative to one of siad inner sleeve and said rigid sleeve members, so as to reduce an effect of relative stiff circumferential spring characteristics of said elastic member;
   a retainer member located at one of opposite axial ends of asi inner sleeve corresponding to said at least one of opposite axial ends of said rigid sleeve member; and
   a sealing rubber member held in pressed abutting contact with an axially outer surface of said radial flange of said rigid sleeve member and a surface of said retainer member which faces said axially outer surface of said radial flange, so as to provide sealing between said retainer member and said rigid sleeve member;

said sealing rubber member comprising an outer annular sealing lip and an inner annular sealing lip spaced radially inwardly from said outer sealing lip in the unloaded condition;

said lips, in the uloaded condition, having diameters which increase in an axially outward direction of said rigid sleeve member away from said radial flange, said outer sealing lip having, in the unloaded condition, a distal end face wghich is tapered such that said distal end face has a diameter which decreased in said axially outward direction;

said outer and inner sealing lips being held under an axial compressive force between the rigid sleeve member and the corresponding retainer member and being elastically compressed radially outwardly and in abutting contact with the retainer member in the loaded condition.

2. An elastic bushing assembly according to claim 1, wherein said inner annular sealign lip, as well as said outer annular sealing lip, has a distal end face which is tapered such that said distal end face of said outer sealng lip decreases in said axially outward direction.

3. An elastic bushing assembly according to claim 1, wherein said inner annular sealing lip has an annular groove formed in a radially inner proximal portion thereof.

4. An elastic bushing assembly according to claim 1, wherein said inner annular sealing lip has an annular groove formed in a radially outer proximal portion thereof.

5. An elastic busing assembly according to claim 1, wherein said sealing rubber member further comprises a base portion which adheres to said axially outer surface of said rdial flange of said rigid sleeve member, and from which said outer and inner annular sealing lips extend, said base portion having an annular groove formed in a radially innermost part thereof, said radially innermost part of said base portion being held spaced apart from said sliding member engaging said rigid sleeve member.

6. An elastic bushing assembly according to claim 1, wherein said outer and inner annular sealing lips have substantially the same length as measured in the axial direction of said rigid sleeve member.

7. An elastic bushing assembly according to claim 1, wherein said inner annular sealing lip has a length smaller than said outer annular sealing lip, as measured in the axial direction of said rigid sleeve member.

8. An elastic bushing assembly according to claim 7, wherein said inner annular sealing lip has an annular groove formed in a radially outer portion thereof.

9. An elastic bushing assembly according to claim 1, wherein said inner annular sealing lip has a wall thickness which decreased in an axially inward direction of said rigid sleeve member.

10. An elastic bushing assembly comprising:

an outer sleeve;

a rigid sleeve member disposed radially inwardly of said outer sleeve in co-axial relation with said outer sleeve, said rigid sleeve member having a radial flange whiche xtends radially outwardly from at least one of opposite axial ends of the sleeve member;

an elastic member interposed between said outer sleeve and said rigid member in integrally fixed relation with said outer sleeve and said rigid sleeve member;

an inner sleeve disposed radially inwardly of said rigid sleeve member;

a sliding member inteprosed between said inner sleeve and said rigid sleeve member and slidable relative to one of said inner sleeve and said rigid sleeve member, so as to reduce an effect of relative stiff circumferential spring characteristics of said elastic member;

a retainer member located at one of opposite axial ends of said inner sleeve corresponding to said at least one of opposite axial ends of said rigid sleeve member; and a sealing rubber member held in pressed abutting contact with an axially outer surface of said radial flange of said rigid sleeve member and a surface of said retainer member which faces said axially outer surface of said radial flange, so as to provide sealing between said retainer member and said rigid sleeve member;

said sealing rubber member comprising an outer annular sealing lip and an inner annular sealing lip spaced radially inwardly from said outer sealing lip in the unloaded condition;

said lips, in the unloaded condition, having diameters which increase in an axially outward direction of said rigid sleeve member away from said radial flange, the lengths of the outer and inner sealing lips being substantially the same as measured in the axial direction of the rigid sleeve member in the unloaded condition, said outer sealing lip having a distal end face which is tapered such that said distal end face has a diameter which decreases in said axially outward direction;

said outer and inner sealng lips being held under an axial compressive force between the rigid sleeve member and the corresponding retainer member and being elastically compressed radially outwardly and in abutting contact with the retainer member in the loaded condition.

* * * * *